United States Patent [19]
Pate

[11] Patent Number: 6,080,505
[45] Date of Patent: Jun. 27, 2000

[54] ELECTROCHEMICAL CELL SAFETY VENT

[75] Inventor: Paul E. Pate, Branford, Fla.

[73] Assignee: Moltech Power Systems, Inc., Alachua, Fla.

[21] Appl. No.: 09/134,506

[22] Filed: Aug. 14, 1998

[51] Int. Cl.[7] ................................................ H01M 2/12
[52] U.S. Cl. ........................... 429/53; 429/54; 429/56; 429/72
[58] Field of Search .................... 429/53, 54, 55, 429/72, 82

[56] References Cited

U.S. PATENT DOCUMENTS

| | | | |
|---|---|---|---|
| 4,271,241 | 6/1981 | Hooke et al. | 429/54 |
| 4,298,662 | 11/1981 | Sugalski et al. | 429/50 |
| 5,171,647 | 12/1992 | Dean et al. | |
| 5,258,242 | 11/1993 | Dean et al. | |

*Primary Examiner*—Maria Nuzzolillo
*Assistant Examiner*—Angela J. Martin
*Attorney, Agent, or Firm*—Sven W. Hanson; Jacqueline M. Nicol

[57] ABSTRACT

A safety vent is provided for incorporation into sealed electrochemical cells. The vent is particularly applicable to cells experiencing transient conditions producing pressures above 250 psi (17.6 kg/cm$^2$). By configuring a cover plate to plastically deform at elevated pressures, an increased venting area can be produced. The increased venting area allows for venting of solid matter which may be forced into vent holes during high temperatures and pressures. Effective plastic deformation is obtained by proper selection of a ductile material and cover plate thickness. By ensuring that vent clogging does not occur, pressures are limited and the integrity of the cell is maintained. By incorporating this vent into a cell, methods of successfully passing industry standard test procedures for secondary cells are provided. The vent also includes an elastomeric sealing element which is captured between the cover plate and a rigid upper plate. The upper plate has a skirt that covers the sealing element but is lifted out of the way of vented matter by the deforming cover plate. Testing of example nickel-metal hydride based Cs cells demonstrate successful survival of a "hot plate" and "continuous overcharge" test procedures. The invention includes cells having increased safety by incorporation of the novel vent structure.

19 Claims, 3 Drawing Sheets

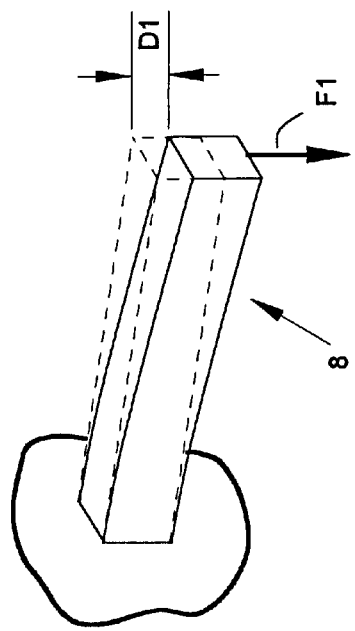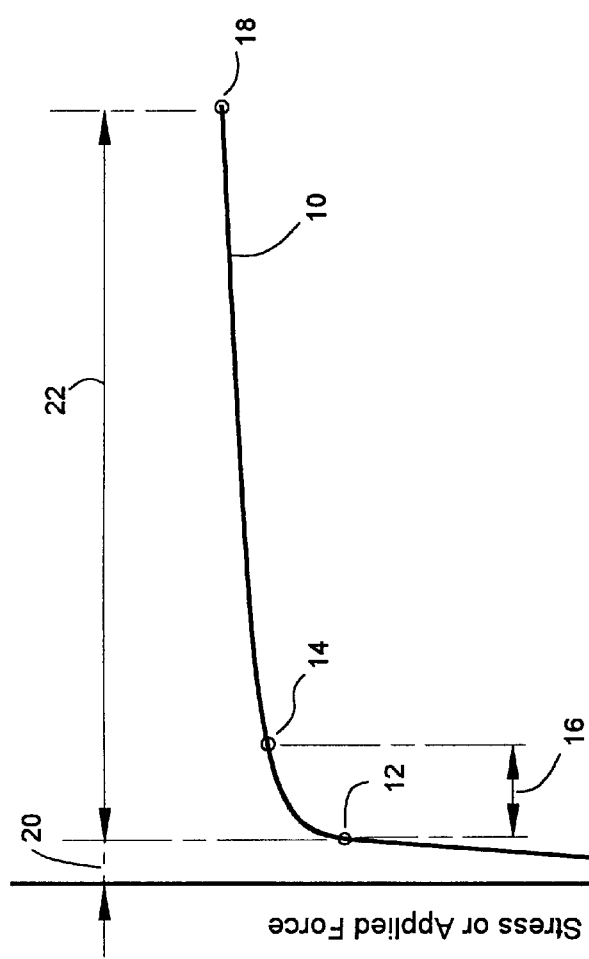
Fig. 1b
Fig. 1a

ELECTROCHEMICAL CELL SAFETY VENT

BACKGROUND OF THE INVENTION

The present invention pertains to venting devices incorporated into containers that are used in a pressurized condition or become pressurized through use or malfunction. Particularly, the present invention pertains to a safety vent that allows increased venting during incidental overpressure conditions that may occur during use of rechargeable electrochemical cells.

Due to improved performance and energy density, rechargeable electrochemical cells have been increasingly used as a power source for a great variety of devices. These secondary cells can be classified as either "vented" or "sealed" in design and operation. Vented cells release gases during the normal operating processes of use. A low pressure vent mechanism is incorporated into many vented cells to allow such a release. Sealed cells are typically pressurized and do not vent under normal operating conditions. Sealed cell operational pressures are a result of gas generation inherent in the chemical processes used for storing and discharging electrical energy. For example, in a secondary cell using a nickel-metal hydride based chemistry, the operational pressures due to hydrogen gas production may be in the range of 90 to 100 psi (6.3 to 7.0 $kg/cm^2$). However, most sealed cells are still designed with a venting mechanism. This is a safety feature intended to accommodate the very high pressures which may result from malfunction or unintended operating conditions. In sealed cells, such as nickel-cadmium or nickel-metal hydride cells, conditions such as unintended overcharging can produce extremely high pressures that are potentially a safety hazard to the user. These pressures may exceed 1000 psi (70.3 $kg/cm^2$) in nickel-metal hydride cells. Initially, pressure in these cells is due to gas generation inherent in the chemistry of the cell. If the gas pressure reaches the designed venting pressure and is successfully released, the pressure will be limited. If gas generation exceeds the venting capacity or if vent clogging occurs, internal pressures can quickly increase. This is exacerbated by high heat generation during charging and more particularly by shorts occurring between the cell electrodes causing high currents. Because of the pressures involved, catastrophic failure with rapid release of energy (explosion) may occur if venting is not successful. Various vent designs have been proposed in the prior art to release the pressures in these cells. Typically, they include a sealing element such as a metallic spring or elastomer that is preloaded. The level of preload is set such as to be overcome only by a pressure exceeding a predetermined safety limit. These are generally resealable seals. In the past, non-resealable "one-time" seals such as burstable diaphragms have also been used. One design of these vents incorporates a diaphragm and a cutting element which are forced together by high internal pressures. When these pressures exceed a limit, the cutting element breaks the diaphragm, allowing venting of gases through the created opening. The obvious disadvantage of such a "one-time" seal is the lack of resealability. After the diaphragm is broken, it is impossible to reseal and repressurize the container to operating pressures. For this reason and others, resealable seals in vents predominate current electrochemical designs. In a resealable seal, a sealing element is typically deformed or moved to create a venting area. The sealing element deformation is elastic, that is reversible, such that at elimination of the overpressure the seal is reformed to again maintain operating pressures. Resealable seals and their desirability are discussed in U.S. Pat. Nos. 5,258,242 to Dean et al. Various designs of resealable seals for electrochemical cells are also disclosed in the U.S. Pat. Nos. 5,171,647 to Dean et al.; 4,298,662 to Sugalski et al; and 4,271,241 to Hooke et al. Many other variations of resealable seals using metallic springs or elastomer sealing elements are provided in published patents.

A basic presumption with these and other previous electrochemical cell vents is that the medium being vented is gaseous in nature. This is due to a focus on the electrochemical reactions and inherent gas formations in the storage and release of electrical energy in these cells. With the current designs and operating procedures being used, particularly in metal hydride cells, this is no longer a proper approach. Because of the capacities and charge and discharge rates possible with newer cell designs, such as nickel-metal hydride cells, new physical conditions beyond operational conditions must be considered. Many nickel-metal hydride cells are charged at rates of several amperes. Discharge rates also may be at these high levels. Accidental overcharging at these rates can result in physical changes to cell materials not experienced by previous cell designs. High temperatures and pressures and large generated gas volumes can cause cell contents to be forced into vent openings. Plastic non-conductive separators, insulating tapes and even active material from the electrodes may be forced out of the cell container. In these circumstances, vents designed to release gaseous matter may be quickly clogged and no longer able to function to reduce pressure. Clogging or inability to vent adequately is often due to insufficient vent area or disabling of the vent opening mechanism. The vent area provided by elastomeric sealing elements is relatively very small—very little area is required to vent low volumes of gas. The elastomer sealing element is also often captured by an effectively rigid structure that does not allow an increase of vent area if needed. Where metallic springs are employed, alone or in conjunction with elastomeric elements, other problems can exist. Metallic springs have the potential to provide large increases in vent area. However, with these designs, the spring elements can cause contact freezing and solidification of the hot liquefied contents of the cell at initial release. Clogging or disabling of the spring element may result. In a cell that cannot vent solids during extreme conditions, pressures overwhelming the integrity of the cell container may be created. For these reasons, prior resealable vent designs are inadequate for many of today's secondary cells.

To ensure integrity of new electrochemical secondary cells, various standard tests have been developed in the industry. One is a "hot plate" test where cells are heated by immersion in a high temperature medium. The resulting thermal expansion of the solid and gaseous contents of the cell creates pressures exceeding normal operating pressures. The high temperatures can cause any plastic components with a low melting point to become fluid and venting of these types of solids is not unusual in this test. A hot plate test temperature of 280 degrees centigrade is typical. Also, to simulate conditions of an accidental overcharge, a "continuous overcharge" test is being used in the industry. This test is particularly applicable to cells normally charged at high rates for short durations where overcharging can result in rapid gas and heat production. Individually, or in a battery, cells are subjected to a continuous high ampere charging circuit. In these situations, where the large amounts of energy being supplied cannot be absorbed, energy dissipation in some form is required. Venting is essential to dissipate energy and limit internal pressures. Expulsion of solid matter through venting is normal during this test. In both the hot plate and continuous overcharge tests, cell success is typically judged by the integrity of the cell container. Most prior vent designs are inadequate for these test conditions.

An additional objective of secondary cell design is to maximize the useful volume of the cell container and thereby maximize capacity. The overall dimensions of commercial electrochemical cells are relatively fixed by specific standards. To maximize the capacity or energy density of a specific cell, the portions of the cell volume used by non-active elements such as vents and seals must be minimized. For this reason, safety vent designs attempt to minimize the dimensions of the vent and seal elements. However, this makes it more difficult to provide a vent device with the larger vent areas needed to allow escape of solids.

What is needed is a safety vent that can operate at the high pressures of many present day electrochemical secondary cells and can vent gaseous and solid matter during extreme conditions while maintaining the integrity of the cell structure. This same vent must be sufficiently compact that it does not reduce the capacity of the cells.

SUMMARY OF THE INVENTION

An object of the present invention is a safety vent that is capable of venting solid matter during high pressure and temperature conditions by plastically deforming and creating an increased vent area.

A second object of the invention is a safety vent operable in two modes, in a first mode venting gases at a lower pressure level and then resealing and, in a second mode, allowing venting of solid matter by plastically deforming and thereby unloading a sealing element.

Another object of the invention is a high pressure safety vent capable of venting solids released from electrochemical cells and having a low profile requiring a minimum of space.

Yet another object is an electrochemical cell having a high pressure safety vent which is capable of venting solid matter.

A further object of the invention is a method of ensuring integrity of electrochemical cells by incorporating an effective safety vent and demonstrating survival during test conditions.

The objects of the present invention are realized by a safety vent incorporating a cover plate configured to elastically and plastically deform during conditions of elevated internal pressures. The plastic deformations achieve an increased range of deflection to create increased venting areas. The desired plastic deformation is obtained by properly selecting a material having sufficient ductility and providing a cover plate thickness giving sufficient flexibility. In embodiments using compressed sealing elements, the increased deflections resulting from plastic strains and deformations are used to help decompress and unseal the sealing elements to allow for more free venting. In one embodiment, a resilient sealing element is compressed and captured between a rigid upper plate and a deformable cover plate. The height of a rigid post connecting the cover plate and upper plate establishes a final compressed thickness of the sealing element. The compression of the sealing element produces forces that retain the sealing element over vent holes in the cover plate. At relatively low pressure venting, the sealing element compression is overcome by the cell internal pressures allowing gases to be vented. In this mode, cover plate deformations are elastic allowing for reforming of the seal upon reduction of internal pressures. In a distinct mode of operation, elevated pressures result in increased stresses in the cover plate until the cover plate plastically deforms. The elevated pressures may be a result of increased gas flow rates or clogging of the vent holes. Because the cover plate deforms in a curved fashion, deflecting away from the upper plate, an increased vent area is produced between the cover plate and upper plate. A skirt extends from the upper plate to adjacent the cover plate, shielding the sealing element. The skirt is not attached to the cover plate enabling it to separate from the cover plate. The deflection of the cover plate also serves to partially unload the sealing element compression. In one embodiment a safety vent is provided which resealably vents at pressures between 400 and 500 psi (28.1 and 35.1 kg/cm$^2$) and plastically deforms to assist venting of solids at pressures above 500 psi (3 5. 1 kg/cm$^2$). This safety vent is incorporated into the pressure resistant canister of a Cs (sub C) configuration nickel-metal hydride cell. In this cell the vent operates to vent solids and maintain pressures below 1000 psi (70.3 kg/cm$^2$) to prevent destruction of the cell. Due to the elevated temperatures and pressures experienced by some secondary cells such as a nickel-metal hydride based cell, maintaining structural integrity of the cell is a safety concern. By incorporating a safety vent as described into electrochemical cells, methods of safely venting these cells of solid matter at high pressures are provided. These methods are employed to ensure structural integrity of commercial cells under prescribed test conditions of elevated temperature and continuous overcharge. An additional advantage of the present vent is the ability to increase the sealing element compression. The increased deflections from the plastically deforming cover plate result in increased unloading of the seal compression during venting. This allows use of thicker seals with greater compression. These enlarged dimensions simplify the manufacturing and assembling of the vent by accommodating increased dimensional tolerances in parts. Preferably, the vent seal is compressed at least 25 percent in the assembled condition. In one embodiment of a Cs cell a low carbon steel having a ductility of about 35–40 percent is used to provide resealable venting below 500 psi (35.1 kg/cm$^2$) and one-time safety venting below 1000 psi (70.3 kg/cm$^2$). Illustrative embodiments of the invention, more clearly demonstrating the novel features claimed, are provided in the following discussion.

DESCRIPTION OF THE DRAWINGS

FIG. 1a is a stress-strain curve typical of some ductile metals. The curve depicts the relative deflections provided by elastic and plastic deformations.

FIG. 1b depicts an element undergoing the loads and deflections associated with the curve of FIG. 1a.

DESCRIPTION OF THE PREFERRED EMBODIMENTS

Figure 3:
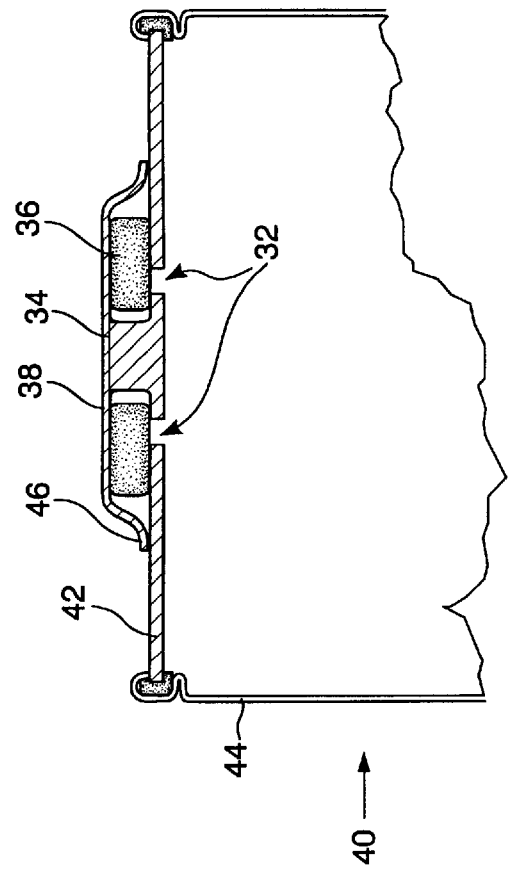
FIG. 3 depicts a cross section of a preferred embodiment of the safety vent incorporated into an electrochemical cell.

Sealed secondary cells must be vented to release internal pressures produced during transient conditions beyond normal operating conditions. If the gas pressure exceeds the designed vent pressure and is successfully released, the pressure will be limited. If gas generation exceeds the venting capacity or if vent clogging occurs, internal pressures may quickly increase. The risk of clogging is increased during high temperature conditions that soften plastics and similar low melting temperature materials used in cells. Where materials and conditions are present to potentially cause vent clogging, increased and open vent path areas are beneficial to ensure clogging does not result in destructive pressures. To provide the increased venting area necessary to allow hot liquefied solids to escape from secondary cells, the present invention uses the increased deflections occurring during plastic deformation of metals. Vent structures in the prior art are typically designed to deflect and then return to position—this is necessary for ability. These are "elastic" deformations in that they do not result in permanent changes in the structure. In order to prevent "plastic" or permanent deformations, prior vent elements must not be deformed or deflected beyond an elastic range of deformation. FIG. 1a depicts a stress-strain curve 10 typical of some metals. FIG. 1b depicts the associated force F1 and deflection D1 applied to an arbitrary element 8. In FIG. 1a, stress or force is indicated on the vertical scale. Strain or deflection is indicated on the horizontal scale. As the force (stress) applied to the element 8 increases, the resulting deflection (strain) also increases. The stress-strain curve 10 provides the strain or deflection associated with any magnitude stress or force up to the failure point 18. While the element 8 is loaded below the elastic limit 12 no permanent deformation or change will result. The element 8 can be repeatedly loaded and unloaded below this elastic limit 12 with no significant consequence. If the element is loaded to a point 14 above the elastic limit 12, a permanent deformation 16 will result—the element is permanently bent but not broken. If the element 8 is loaded beyond its capacity, it fails or breaks at the failure point 18.

Figure 2:
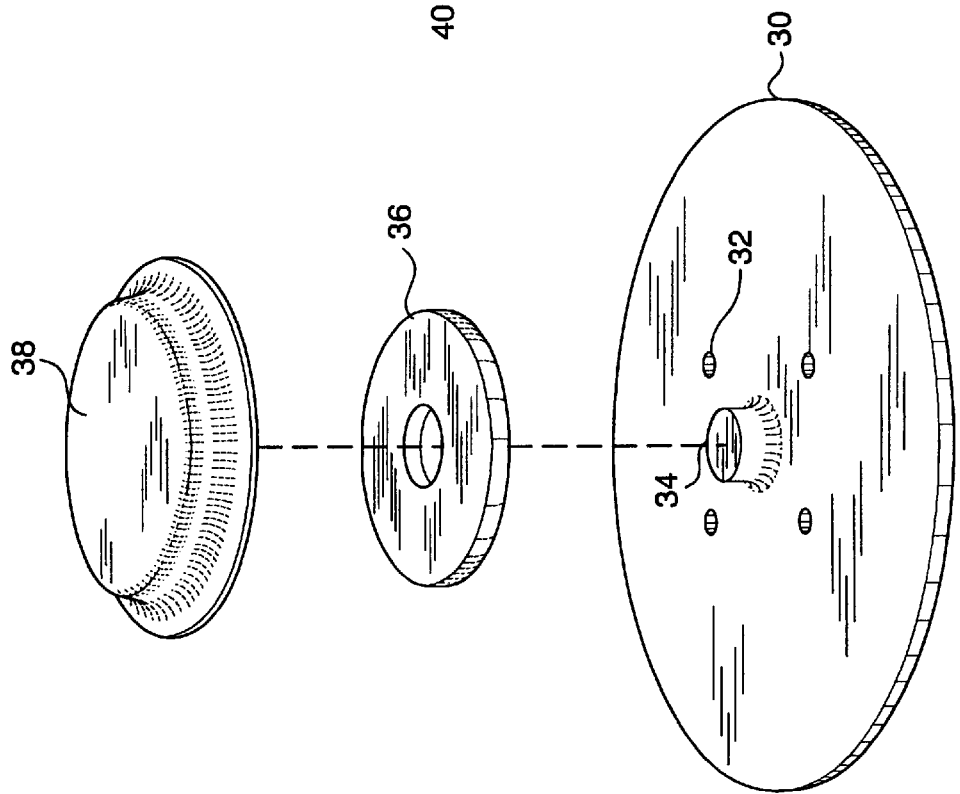
FIG. 2 is a perspective view of the elements of a safety vent according to one embodiment of the present invention.
Figure 4A:
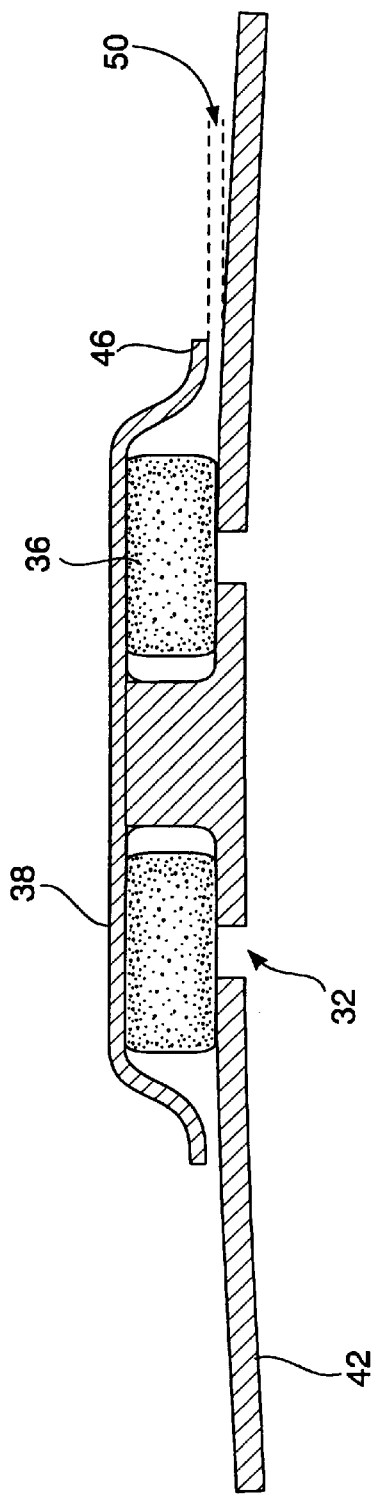
FIGS. 4a and 4b depict cross sections of two safety vents having cover plates formed of metals with different properties. The increased deformation of the cover plate with increased ductility is illustrated.
Figure 4B:
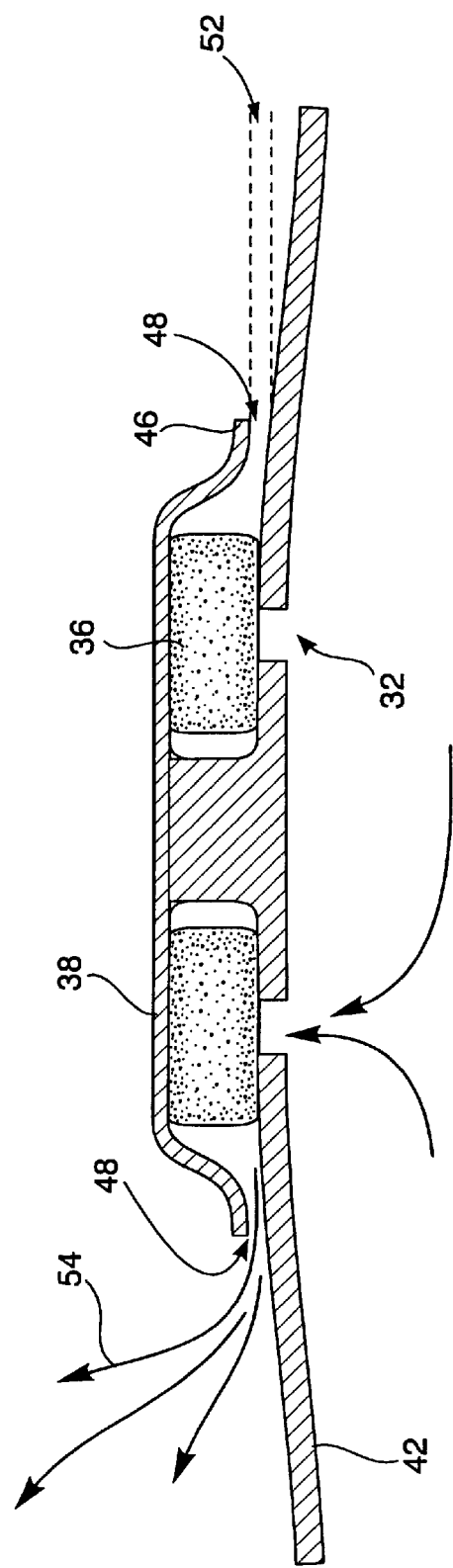

With prior art vents that attempt to maintain resealability, it is required that no elements experience plastic deformation. Only if all deflections and deformations are elastic may the vent elements' functional movements be repeated. If a "resealable" vent element is plastically (permanently) deformed it will not effectively reseal. In FIG. 1a the potential plastic range of deflection 22 is greater than the total elastic deflection 20. The combined deflection range is even greater. In ductile metals the plastic range 22 is greater than for nonductile metals. That is, for the same applied force, greater deflections occur in ductile metals. In the instant invention, the increased range of deflections possible when using a portion of the plastic deformation range is applied to unload compressed seal elements and increase the effective vent area. This is more readily explained with respect to FIGS. 2–4. In FIG. 2, the elements of a safety valve according to one embodiment of the instant invention are shown. A bottom plate 30 that acts as a pressure containing wall is provided with a multiple of vent holes 32. The vent holes 32 are arranged around a raised post 34. A resilient sealing element 36 includes a center hole that is sized so that the sealing element may fit over the post 34. The outside perimeter of the sealing element 36 is sufficient to cover the vent holes 32 when the sealing element 36 is placed over the post 34 and in contact with the bottom plate 30. The sealing element 36 preferably has a circular perimeter while the vent holes 32 are preferably arranged in a circular pattern about a centerline through the post 34. A relatively rigid upper plate 38 is located on the post 34 and there attached to capture the sealing element 36 in place. The sealing element 36 has a thickness greater than the post 34 height. The thickness of the sealing element 36 and the height of the post 34 determine the compression the sealing element 36 experiences when the upper plate 38 is secured. This compression and the impermeability of the sealing element 36 create a seal that prevents matter from escaping through the vent holes 32 from the high pressure side of the bottom plate 30 to the atmosphere. In order for venting to occur, either the internal pressure must overcome the sealing element 36 force over the vent holes 32 or the sealing element 36 must be decompressed to reduce this force. The resilient deformable nature of the sealing element 36 also helps to prevent leaking at the vent hole. In FIG. 3, a preferred embodiment of the instant safety vent is shown in cross section incorporated into an electrochemical cell 40 such as a nickel-metal hydride cell. The bottom plate is shaped and sized to fit as a flat cover plate 42 interlocking with the cylindrical walls 44 of the cell 40. A skirt 46, integral with the upper plate 38, extends down to a position proximate to the top surface of the cover plate 42. The skirt 46 is not secured to the cover plate 42. In operation, as the cell 40 is pressurized, the cover plate 42 bulges or deflects outward while it is restrained at the edges. This is shown in FIGS. 4a and 4b which depict two safety vents deforming under the same pressure level. The upper plate 38 remains at all times relatively rigid. As the cover plate 42 bulges, it lifts the upper plate 38 and skirt 46 relatively away from the cover plate 42. With respect to the upper plate 38, the cover plate 42 deflects downward and away. This deflection results in at least partial unloading or decompressing of the sealing element 36. The greater the internal pressure and consequent bulging, the greater the deflection and unloading of the sealing element 36. When the internal pressure exceeds the sealing element forces, venting occurs through the vent holes 32, past the sealing element 36 and through a vent area 48 between the upper plate skirt 46 and cover plate 42. For the same amount of initial sealing element compression, a more flexible cover plate will allow venting at a lower pressure than will a relatively rigid cover plate. Also, for a fixed vent pressure, increased sealing element 36 compression may be used where the cover plate 42 has increased flexibility.

As long as the cover plate bulging and deflections are elastic, the cover plate 42 will return to its original position when pressure is reduced, allowing the sealing element 36 to form a seal again. This is the basis for most prior art resealable seals. In the present invention, the cover plate 42 is sufficiently flexible and ductile to plastically deform, without rupturing, at a pressure below a safety limit, to more effectively unload the sealing element 36 and increase the vent area 48. In FIG. 4a the cover plate is elastically deforming with resulting elastic deflection 50 of the cover plate 42 from the skirt 46. The deformations remain elastic because the material yield strength is high relative to the stress induced. In FIG. 4b, increased flexibility due to lower yield strength and increased ductility of the material results in plastic deformation and a total deflection 52 (of the cover plate from the skirt) greater than the elastic deflection 50. The increased deflection means increased venting area and greater flow rates at a given pressure. If either the sealing element 36 is not sufficiently unloaded, or a free vent area is not provided for solid matter to escape, clogging can result. In FIG. 4b the free venting passage 54 for venting is shown passing through the enlarged vent area 48 between the cover plate 42 and skirt 46. If the venting passage becomes clogged, internal pressure cannot be reduced. As used here, "solids" refer to any nongaseous matter that may be forced out of a container during venting due to extreme temperatures and pressures. In the case of sealed electrochemical cells, particularly metal hydride cells, elements such as the nonconductive separators used to isolate electrodes can be caused to flow and be forced into vent holes due to heat and pressure build-up during conditions such as overcharging. Other solid matter such as plastic insulating tapes having low melting temperatures and even active materials from the electrodes may be forced out of the cells. In some "jelly roll" style cells, a polypropylene insulator is used at the top of the electrodes to prevent inadvertent contact with the conductive cover plate end of the cell. Because of its proximity to the vent holes, this insulator is in a position to be more easily forced into vent holes and cause clogging.

To provide effective venting in conditions where solids may be forced through the vent holes, a free vent passage must be provided. This means a passage from the pressurized side of the cover plate to an unpressurized space that is relatively unobstructed with respect to the escape of solid matter. At a particular vent pressure and cover plate diameter, the deflection of the cover plate is determined by the cover plate thickness and material properties. The potential for plastic deformation (ductility) is found from a material's experimental stress-strain curve or representative data. Because the actual internal pressures in electrochemical cells during extreme events may not be directly measurable or known, the selection of cover plate material and thickness may, by necessity, be determined by experimental trial. In may be possible to determine pressures by calculating it from the resulting container wall bulge and the known properties and dimensions. Alternatively, data for bulge at specific pressures may be obtained by artificially pressurizing cell containers to known pressures and measuring the consequent bulge. These data can then be compared to bulge data from testing cells under actual conditions and the actual pressures inferred. If the actual pressure is not obtained, design of a proper vent is still possible. In those cases, the pressure limit is defined by the condition. That is, cells with various vent designs are tested under a specific condition and the proper vent selected by trial and error. Where the safety pressure limits are known, analytical models such as computer implemented models can facilitate the selection process. The vent, and specifically the cover plate, must also be sufficiently strong to sustain venting pressures without rupture. The optimum thickness, determined by creation of sufficient relative deformations for venting, may result in a reduced margin of safety based on the most extreme pressures. This is because minimizing stresses is not the objective of the vent design. Rather than requiring the cell container to survive the highest pressures (resulting from conditions such as clogged venting), the actual pressures the cell is exposed to are limited by ensuring that venting occurs. Because the cover plate is typically used as part of the electrical termination of the electrochemical cells, the cover plate is preferably of an electrically conductive material. Preferably, the cover plate is fabricated from a steel composition having a low yield and the required ductility. In order to provide significant deflection, the cover plate material must be sufficiently ductile to allow deformations at the venting pressure at least several times the maximum elastic deformations.

The vent holes allow passage of gases and solids during venting. The vent holes' individual size and total area must be sufficient to vent solids without clogging. They must also be located so that the sealing element may be positioned to cover the holes with overlap. In the figures, the vent holes are positioned sufficiently distant from the post to allow the sealing element to fit easily over the post and still cover the vent holes. The force of the sealing element on the vent holes is determined by the durometer of the sealing element material and the amount of compression. At a minimum, the sealing element force over the holes must exceed the operational pressure over the same area. Practically, it is preferred to use as high a compression as possible to accommodate manufacturing variations in the dimensions of the various vent parts. A high compression provides a greater tolerance for error. However, increased compression increases the need for using the plastic range of deformation of the cover plate to accomplish the required unloading during venting. If the sealing elements and vent holes are located at an increased radius from the cover plate centerline, a higher compression may be employed and still be sufficiently unloaded during venting. This is because the relative deflection of the cover plate increases with increasing radius from the center. For this reason also, smaller cover plates used on smaller devices may require a reduced sealing element compression. It is known that such sealing elements must be impervious to the electrolytes used in electrochemical cells and must provide a barrier to the gases produced. Ethylene-propylene (EPDM) rubber is a suitable material for sealing elements in many electrochemical cells.

The upper plate is formed of any rigid metal and is preferably formed of nickel plated steel. Because the upper plate may be used as a cell terminal, electrical conductivity is needed. The skirt of the upper plate acts to cover and protect the sealing element during use. The upper plate may be welded or otherwise centrally secured to the post. The post itself is preferably formed integral with the cover plate, but alternatively may be integral to the upper plate. Alternatively, the post may be fabricated separately and then secured to the upper plate and cover plate on assembly. The post provides the proper standoff to set the desired final thickness and consequently the compression of the sealing element.

As well as providing venting of solids during extreme pressure loading, the present invention and sealing element can provide venting of gases at lower pressures during operational modes. Venting of gases does not require the same free vent passage as venting of solids. If the sealing element is sufficiently decompressed such that the internal pressure on any vent hole exceeds the sealing element force, gases will escape. The lower flow resistance of gases means gas venting does not require a large vent area and partial obstructions are not a significant barrier. As well, freezing and clogging is not a concern with gases. By providing a sealing element with appropriate compression and a cover plate with the appropriate flexibility and deformation range, a seal may be formed which vents gases at a lower pressure and also vents solids at higher pressures. If the deformations of the cover plate during gas venting are in the elastic range, this mode of lower pressure venting will be resealable. "Resealable" in the context of the present invention means a seal which, upon removal or reduction of cell pressure, will form a seal which maintains sufficient pressure to allow continued function of the cell. This is particularly applicable to nickel-metal hydride cells which may have transient malfunctions which are recoverable, that is, the cell may be operable after the transient condition ceases. For these conditions, resealable venting is most desired.

Example—Nickel Metal Hydride Cells

Cs (sub-C) nickel-metal hydride secondary cells were built to test the present safety vent concept. In this configuration cell, the cover plate diameter was 0.765 inch (19.4 mm). Several cover plate thicknesses were preliminarily tested. This consisted of fabricating Cs canisters with cover plates but without vent holes. Known conditions for which venting of gases was desired from this cell produce pressures up to about 250 psi (17.6 $kg/cm^2$). The unvented canisters were pressurized with nitrogen to this pressure and the cover plate bulge measured. Cover plates having thickness of 0.020, 0.025 and 0.030 inch (0.51, 0.63, and 0.76 mm) were compared in this way. All but the 0.030 inch (0.76 mm) thick cover plate were determined to deform excessively. To prevent excessive loss of electrolyte from unnecessary venting, the vent was designed to resealably vent at about 400 to 500 psi (28.1 to 35.1 kg/cm$^2$). A sealing element was selected for venting at this pressure range. An ethylene-propylene rubber sealing element with an initial thickness of 0.060 inch (1.52 mm) was compressed by 25 percent in its installed condition between the cover plate and upper plate. The durometer of the seal rubber was 30 Shore A. Four vent holes were located symmetrically on a 0.228 inch (5.79 mm) diameter pattern around a raised post formed in the cover plate. The diameter of each vent hole was 0.037 inch (0.94 mm).

Pressure Testing: Cells were fabricated with plugged vent holes. Samples were artificially pressurized to 200, 500, and 1000 psi (14.1, 35.1, and 70.3 kg/cm$^2$) and deflections at the cover plate centerline measured while pressurized and after release of pressure. At 200 psi, pressurized and post-test deflections were 0.0045 and 0.001 inch (0.11 and 0.025 mm), respectively. Deflections of the cover plate for 500 psi (35.1 kg/cm$^2$) were 0.045 and 0.039 inch (1.1 and 0.99 mm), pressurized and post-test respectively. The post-test deflection approximates the pressurized plastic deformation, making the ratio of plastic to elastic deformation approximately 6.5 to 1 at 500 psi (35.1 kg/cm$^2$). At 1000 psi (70.3 kg/cm$^2$), cover plate post-test deflections were 0.084 (2.1 mm). Post-test, the gap between the upper plate skirt and cover plate was measured and found to be about 0.018 inch (0.46 mm). Due to potential damage to equipment at rupture, the pressurized deflection at 1000 psi was not measured. The relative deflection of the upper plate with respect to the cover plate was not measured.

Final testing was performed to determine the capability of the vent configuration to deform sufficiently to release solids at high pressures.

Hot Plate Test: In this test, known in the industry as a "Hot Plate" test, cells are heated to an extreme temperature to test integrity. Groups of 20 fully charged cells were submerged in a bath of inert pellets heated to a temperature of 280 degrees centigrade. The cell vents remained uncovered and visible above the pellets to allow viewing of any vented matter. The test conditions continued until physical activity (venting) ceased or the cells physically failed. A successful test result was recorded if a cell survived the test condition without destruction of the cell body.

Continuous Overcharge Test: In this test, a battery of cells is subjected to a continuous nine ampere charging condition. Charging continues in this test until a cell physically fails or an internal short or open circuit occurs, ending charging. The objective of this test is to simulate accidental overcharge of cells normally charged in a short duration. A successful test result was recorded if the cells survived the test condition without destruction of the cell body. In previous tests of similar nickel-metal hydride cells incorporating metallic spring actuated safety vents, dramatic failure in the form of explosive detachment of the cover plate and emptying of the cell contents occurred after 24 minutes of charging.

Results: A total of 90 cells were built and subjected to the Hot Plate test. No failures were recorded. Venting of solid matter could be observed from all cells. A total of 240 cells were built and subjected to the Continuous Overcharge test. No failures were recorded. Venting of solid matter was observed from all cells. In no cases did the cover plates separate from the cells or rupture. Permanent deformation of the cell cover plate was observed in all cells. The upper plate skirts had visibly separated from the cover plates. While the internal pressures reached were not measured during testing, they can be estimated in the range of about 500 to 1000 psi (35.1 to 70.3 kg/cm$^2$). The upper range is known from prior pressurization tests where empty Cs cells of the same configuration were pressurized with nitrogen. Those cells failed by separation of the cover plates at about 1100 psi (77 kg/cm$^2$). In the above tests, the cover plates were fabricated of deadsoft (#5 temper) aluminum killed, non-earing cold rolled (Rockwell B55 max. approx.), low carbon steel strip. Both sides of the stock material were nickel plated to a thickness of 0.000075 inch (0.0019 mm) minimum. The specific chemistry of the steel is provided in Table 1.

TABLE 1

| Chemistry of Cover Plate Stock Steel | |
|---|---|
| Element | Weight Percentage |
| carbon | 0.06 to 0.10 |
| manganese | 0.20 to 0.60 |
| phosphorous | 0.040 (max.) |
| sulfur | 0.050 (max.) |

This material has a known ductility of about 35 to 40 percent as measured by reduction of area in standard tensile tests. There are other experimental measures of ductility. Regardless of the particular indicator, those materials having greater ductility provide a greater range of deflections to accomplish the functions of the present invention. The specific dimensions and materials used in the above example are applicable to Cs cells where resealable venting is desired for conditions in the range of 250 to 500 psi (17.6 to 35.1 kg/cm$^2$) and safety venting below 1000 psi (70.3 kg/cm$^2$) is necessary to prevent failure of the cell container. Between 250 psi and the designed venting range of 400 to 500 psi (28.1 to 35.1 kg/cm$^2$) the cell canister must maintain its integrity and functionality in the pressurized state until the pressure is reduced by gas absorption or lowered temperatures. Resealable venting occurs between 400 and 500 psi (28.1 and 35.1 kg/cm$^2$). Above 500 psi (35.1 kg/cm$^2$) the vent will plastically deform sufficiently to increase venting and prevent pressures from reaching the integrity limit of the cells even if typical solid matters are ejected. To apply the same vent concept in larger or smaller cells may require changing cover plate geometry or thickness. In alternative embodiments, the cover plate includes raised radial ribs which provide increased stiffness to the cover plate. This is beneficial to increase stiffness with a minimum of increased weight. In a "D" cell having a diameter greater than a Cs, the cover plate will have increased flexibility and therefore require increased thickness to achieve proper venting at the desired conditions. Conversely, in "AA" configuration cells the vent sealing element, hole pattern and upper plate dimensions may be reduced to fit in the constraints of the smaller AA cell diameter. The smaller diameter AA cover plate must also have reduced thickness to provide the needed deflections. These examples assume the same pressure conditions. Embodiments of the present vent are applicable to cells using any of a variety of existing and future secondary cell processes and chemistries. Different chemistries and conditions may also create high pressures and the potential of solid matter flow in venting conditions. It may be necessary to alter vent hole diameter depending upon the nature of the solid material potentially vented. Cells having different electrodes, separators, or other components may decompose under high temperatures and pressures in a different manner than the nickel-metal hydride cells in the above example. In alternative embodiments of the invention, hole size and the number of holes, are increased to accommodate increased total volume of vented matter.

To maximize the energy density available in the fixed overall dimensions of standard secondary cells, the space taken up by non-active structure must be minimized. By minimizing the sealing element thickness, and functioning without conventional springs, the present vent design provides a safety vent using little space and leaving a maximum of volume for energy providing active materials. Because the present vent design can be employed to ensure venting at lower pressures than otherwise, the cell container may also be designed to lower pressures. New methods are being employed in the industry today to form electrochemical cell containers with thinner walls. Thinner walls use less material and are therefore generally less expensive. But thinner walls are also not as strong in resistance to pressure stresses. The cells in the above example used canisters having a nominal wall thickness of 0.016 inch (0.41 mm). It is desired to use canisters having a nominal wall thickness of 0.01 1 inch (0.28 mm). To make use of these thinner cell containers, the maximum pressures that these cells will experience must be reduced. The present vent designs allow containers to be made with thinner walls and generally reduce their strength requirements. The present vent design is also easily manufactured and assembled. As discussed above, an added advantage of the present design is increased deflections to accomplish venting with the potential of accommodating greater manufacturing tolerances. This concept is applicable to devices other than electrochemical cells also requiring safety venting. Variations of the present safety vent are contemplated in other pressurized containers requiring safety venting.

The above examples are intended as illustrative of the inventive elements of the present invention. Other embodiments and variations incorporating other elements and materials, existing and future, will become clear to those skilled in the art. The scope of the invention is intended to be defined by the following claims.

I claim:

1. A safety vent for protecting an electrochemical cell from overpressure conditions by allowing venting of gaseous and solid matter, the vent comprising:

an upper plate;

a cover plate, the cover plate having at least one vent hole;

a compressible resilient sealing element, the sealing element being partially compressed and retained between the upper plate and the cover plate forming a seal over the at least one vent hole;

the cover plate being adapted to plastically deform at a first pressure to create a free vent passage capable of venting solid matter;

such that gaseous and solid matter may escape through the vent thereby limiting internal pressure.

2. The safety vent according to claim 1, wherein:

the first pressure is greater than about 500 pounds per square inch.

3. The safety vent according to claim 2, wherein:

the vent is adapted to resealably break the seal, at a reduced second pressure, sufficiently to allow venting of gases.

4. The safety vent according to claim 3, wherein: the reduced second pressure is in a range of about 100 to 500 pounds per square inch.

5. The safety vent according to claim 4, wherein:

the sealing element is compressed at least 25 percent.

6. The safety vent according to claim 1, wherein:

the vent is adapted to be incorporated into a sub-C configuration electrochemical cell.

7. The safety vent according to claim 6, wherein:

the cover plate is formed of a metal having a ductility of at least about 35 to 40 percent reduction of area.

8. An electrochemical cell having increased safety resulting from providing effective venting of gaseous and solid matter during conditions of internal pressure above normal operating pressures, the cell comprising:

an electrochemical cell body having a pressure resistant container, and a safety vent integral with the container and adapted to vent solid matter at a pressure of about 500 to 1000 psi;

such that the safety vent allows solid matter to be readily expelled from the container without clogging, the cell internal pressure thereby being limited such as to prevent destruction of the cell.

9. The electrochemical cell according to claim 8, wherein:

the safety vent comprises:

a cover plate, the cover plate having at least one vent hole;

a sealing element, the sealing element being compressed and disposed over the at least one vent hole to form a seal; and the cover plate being adapted to plastically deform at a pressure below the safety limit so as to at least partially unload the sealing element and form a free vent passage;

such that gaseous and solid matter may be vented through the at least one vent hole.

10. The electrochemical cell according to claim 9, wherein:

the electrochemical cell body is configured as a sub-C cell.

11. The electrochemical cell according to claim 10, wherein:

the electrochemical cell body comprises at least one electrode having a nickel-metal hydride based active material.

12. A method of protecting a secondary cell from conditions of elevated temperature and pressure by allowing venting of solid matter; the method comprising:

incorporating into a secondary cell a safety vent according to claim 1;

such that upon subjecting the cell to a condition causing solid matter to pass into the safety vent the solid matter may be expelled from the cell allowing the cell pressure to be reduced or limited to below a safety limit.

13. A method of ensuring and demonstrating the structural integrity of an electrochemical cell during conditions producing elevated pressures within the electrochemical cell; the method comprising:

incorporating into an electrochemical cell a safety vent capable of venting solid material at elevated pressures; and subjecting the cell to a condition causing elevated temperature and pressure;

such that solid material may be expelled through the safety vent thereby limiting the pressures within the electrochemical cell such that the cell integrity is maintained.

14. The method of claim 13, wherein:

the step of incorporating a safety vent further comprises forming a safety vent capable of venting solid material at a pressure between about 500 and 1000 psi.

15. The method of claim 14, further comprising:

selecting a cover plate having a thickness and material allowing significant plastic deformation of the cover plate when exposed to internal pressures above 500 psi.

16. The method of claim 14, wherein:

the step of subjecting the cell to a condition comprises exposing the cell to a heated medium.

17. The method of claim 14, wherein:

the step of subjecting the cell to a condition comprises subjecting the cell to a charging circuit.

18. The method of claim 14, wherein:

the safety vent is incorporated into a nickel-metal hydride cell.

19. An electrochemical cell safety vent providing for effective venting of gaseous and solid matter during conditions of elevated temperature or pressure, the safety vent comprising:

a cell cover plate, the cover plate having at least one vent hole;

an upper plate, the upper plate having a skirt extending to the cover plate;

a post, the post having a predetermined height and being located between the cover plate and upper plate and forming a structural and electrical connection between them;

a sealing element, the sealing element being sized and positioned to cover the at least one vent hole and being compressed between the cover plate and upper plate to a compression sufficient to prevent gaseous venting through the at least one vent hole in a first condition, and the sealing element being substantially captured between the upper plate, skirt and cover plate;

the cover plate, upper plate and sealing element being configured such that:

upon application of a pressure greater than a first pressure, the cover plate substantially elastically deforms to partially decompress the sealing element from the first condition; and upon application of a second pressure greater than the first pressure, the cover plate plastically deforms, without failing, partially unloading the sealing element and separating the skirt from the cover plate to form an enlarged vent area thereby allowing passage and venting of solids through the at least one vent hole without clogging;

such that at pressures below the first pressure, the sealing element will remain compressed to prevent venting, at pressures above the first pressure but below the second pressure, resealable venting of gases will occur, and at pressures above the second pressure the sealing element will allow release of solids which may pass through the vent holes.

* * * * *

UNITED STATES PATENT AND TRADEMARK OFFICE
CERTIFICATE OF CORRECTION

PATENT NO : 6,080,505
DATED : June 27, 2000
INVENTOR(S) : Paul E. Pate

It is certified that error appears in the above-identified patent and that said Letters Patent are hereby corrected as shown below:

Column 4, line 14: "3 5. 1" should read --35.1--.
Column 5, line 12: "ability" should read --resealabiltiy--.
Column 9, line 13: "30 Shore" should read --70 Shore--.
Column 11, line 22: "0.01 1" should read --0.011--.

Signed and Sealed this

Third Day of April, 2001

Attest:

NICHOLAS P. GODICI

Attesting Officer

Acting Director of the United States Patent and Trademark Office